(12) United States Patent
Nakagawa et al.

(10) Patent No.: US 7,451,090 B2
(45) Date of Patent: Nov. 11, 2008

(54) INFORMATION PROCESSING DEVICE AND INFORMATION PROCESSING METHOD

(75) Inventors: Kenichiro Nakagawa, Kawasaki (JP); Makoto Hirota, Shibuya-ku (JP); Hiromi Ikeda, Yokohama (JP); Tsuyoshi Yagisawa, Kawasaki (JP); Hiroki Yamamoto, Yokohama (JP); Toshiaki Fukada, Yokohama (JP); Yasuhiro Komori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 11/135,083

(22) Filed: May 23, 2005

(65) Prior Publication Data

US 2005/0267747 A1 Dec. 1, 2005

(30) Foreign Application Priority Data

Jun. 1, 2004 (JP) ............................. 2004-163363

(51) Int. Cl.
*G10L 21/00* (2006.01)
(52) U.S. Cl. .................. 704/275; 704/270; 704/272
(58) Field of Classification Search .................. 704/275, 704/235, 231, 270, 270.1, 246, 272
See application file for complete search history.

(56) References Cited

U.S. PATENT DOCUMENTS

| 5,737,491 | A |   | 4/1998 | Allen et al. |
| 5,983,186 | A | * | 11/1999 | Miyazawa et al. .......... 704/275 |
| 6,625,335 | B1 |   | 9/2003 | Kanai |
| 2002/0101513 | A1 |   | 8/2002 | Halverson |
| 2002/0102012 | A1 |   | 8/2002 | Keller et al. |
| 2002/0184196 | A1 |   | 12/2002 | Lehmeier et al. |
| 2003/0059112 | A1 |   | 3/2003 | Loui et al. |
| 2003/0063321 | A1 |   | 4/2003 | Inoue |
| 2004/0260558 | A1 |   | 12/2004 | Loui et al. |

FOREIGN PATENT DOCUMENTS

| EP | 1158429 A2 | 11/2001 |
| EP | 1229458 A2 | 8/2002 |
| EP | 1262883 A2 | 12/2002 |
| JP | 9-135417 A | 5/1997 |

* cited by examiner

*Primary Examiner*—Huyen X. Vo
(74) *Attorney, Agent, or Firm*—Canon U.S.A., Inc., IP Division

(57) ABSTRACT

In a system implementing image retrieval by performing speech recognition on voice information added to an image, the speech recognition is triggered by an event, such as an image upload event, that is not an explicit speech-recognition order event. The system obtains voice information added to an image, detects an event, and performs speech recognition on the obtained voice information in response to a specific event, even if the detected event is not an explicit speech-recognition order event.

3 Claims, 7 Drawing Sheets

| EVENT NAME | START SPEECH RECOGNITION ? |
|---|---|
| SPEECH-RECOGNITION START ORDER | YES |
| PRINT START ORDER | NO |
| ⋮ | ⋮ |
| IMAGE UPLOAD ORDER | YES |

1 IMAGE TO BE UPLOADED

UPLOAD

```
string=f a o n e n o y a m a a;type=typewriter;score=-212110;
string=h a o n e n o y a m a;type=typewriter;score=-212144;
string=h a k o n e;type=isolatedword;score=-192296;
string=h a k o;type=isolatedword;score=-202110;
string=y a m a;type=isolatedword;score=-212144;
```

| EVENT NAME | START VOICE RECOGNITION ? |
|---|---|
| SPEECH-RECOGNITION START ORDER | YES |
| PRINT START ORDER | NO |
| ⋮ | ⋮ |
| TIMER EVENT | IF SPEECH-RECOGNITION RESULT FILE IS NOT STORED IN IMAGE/SPEECH RECOGNITION RESULT DATABASE: YES<br>IF STORED: NO |

901

INFORMATION PROCESSING DEVICE AND INFORMATION PROCESSING METHOD

BACKGROUND OF THE INVENTION

1. Field of the Invention

The present invention relates to a device and method for managing image data on a computer connected to an image pickup apparatus via a network or the like.

2. Description of the Related Art

Digital cameras have become widely used these days. The user generally manages digital images captured by a portable image-pickup apparatus, such as a digital camera, on a PC or server. For example, captured images can be organized in folders on a PC or server, and specific images can be printed or inserted into greeting cards. Moreover, some images, if managed on the server, can be available to the other users.

In such cases, the user needs to search for a desired image. If the number of images to be searched is small, all images can be displayed as thumbnails, which allow the user to easily browse and find a desired image. However, if hundreds of images have to be searched or if a group of target images is divided and stored in different folders, the user cannot easily find a desired image just by browsing.

One of the solutions is to add voice annotations, for use in retrieval, to images on the image pickup apparatus. For example, if an image of a mountain is captured, a voice annotation, such as "hakone-no-yama" (meaning a mountain in Hakone (geographic name)), is added to the image. This voice data is paired with the data of the captured image and stored in the image pickup apparatus. Then, the voice data is subjected to speech recognition in the image pickup apparatus or on a PC to which the image is uploaded, and is converted into text data. Once annotation data is converted into text data, the image can be found by keywords, such as "yama" (meaning mountain) and "hakone", using a typical text search method.

Some techniques using such voice annotations are disclosed in Japanese Patent Laid-Open No. 2003-219327, Japanese Patent Laid-Open No. 2002-325225, and Japanese Patent Laid-Open No. 9-135417. In these techniques, the user adds a voice annotation to an image, during or after image capturing. Then, using known speech recognition techniques, the user uses the voice data in image retrieval.

Since execution of speech recognition results in an extremely heavy processing load, it is not realistic to execute speech recognition in currently available portable image pickup apparatuses. Therefore, it is desirable that an image and voice data added to the image be uploaded from an image pickup apparatus to a PC or server such that speech recognition can be executed thereon.

As described above, there are proposed and implemented techniques in which an image pickup apparatus only performs the acquisition of voice annotations, and speech recognition is executed on a PC or server to which image data and voice data are uploaded. However, as for the timing of speech recognition performed on voice annotation data added to images captured, there is no clear description, or speech recognition is performed in response to a request from the user upon completion of uploading image data and voice data.

It is thus cumbersome for the user to go through a process of performing the "uploading of images" and giving a "speech recognition order".

SUMMARY OF THE INVENTION

To solve the problem described above, the present invention provides an information processing device that includes receiving means for receiving an image and voice information from another apparatus, speech recognition means for performing speech recognition on the voice information in the case that the voice information is received by the receiving means, and storing means for associating and storing with the image a speech recognition result obtained by the speech recognition means.

Moreover, the present invention provides an information processing device that includes obtaining means for obtaining voice information related to an image, detecting means for detecting an event, determining means for determining whether or not an event detected by the detecting means is a speech-recognition order event; speech recognition means for performing speech recognition on voice information in response to a specific event, even when the event determined by the determining means is not a speech-recognition order event; and storing means for associating and storing with the image a speech recognition result obtained by the speech recognition means.

Further features and advantages of the present invention will become apparent from the following description of exemplary embodiments with reference to the attached drawings.

BRIEF DESCRIPTION OF THE DRAWINGS

FIG. 9 shows an example of an event-interpretation data table for an image management device according to a third embodiment.

DESCRIPTION OF THE EMBODIMENTS

Embodiments of the present invention will now be described with reference to the drawings.

First Embodiment

An image management device will be described as an example of an information processing device of the present invention.

Figure 1:
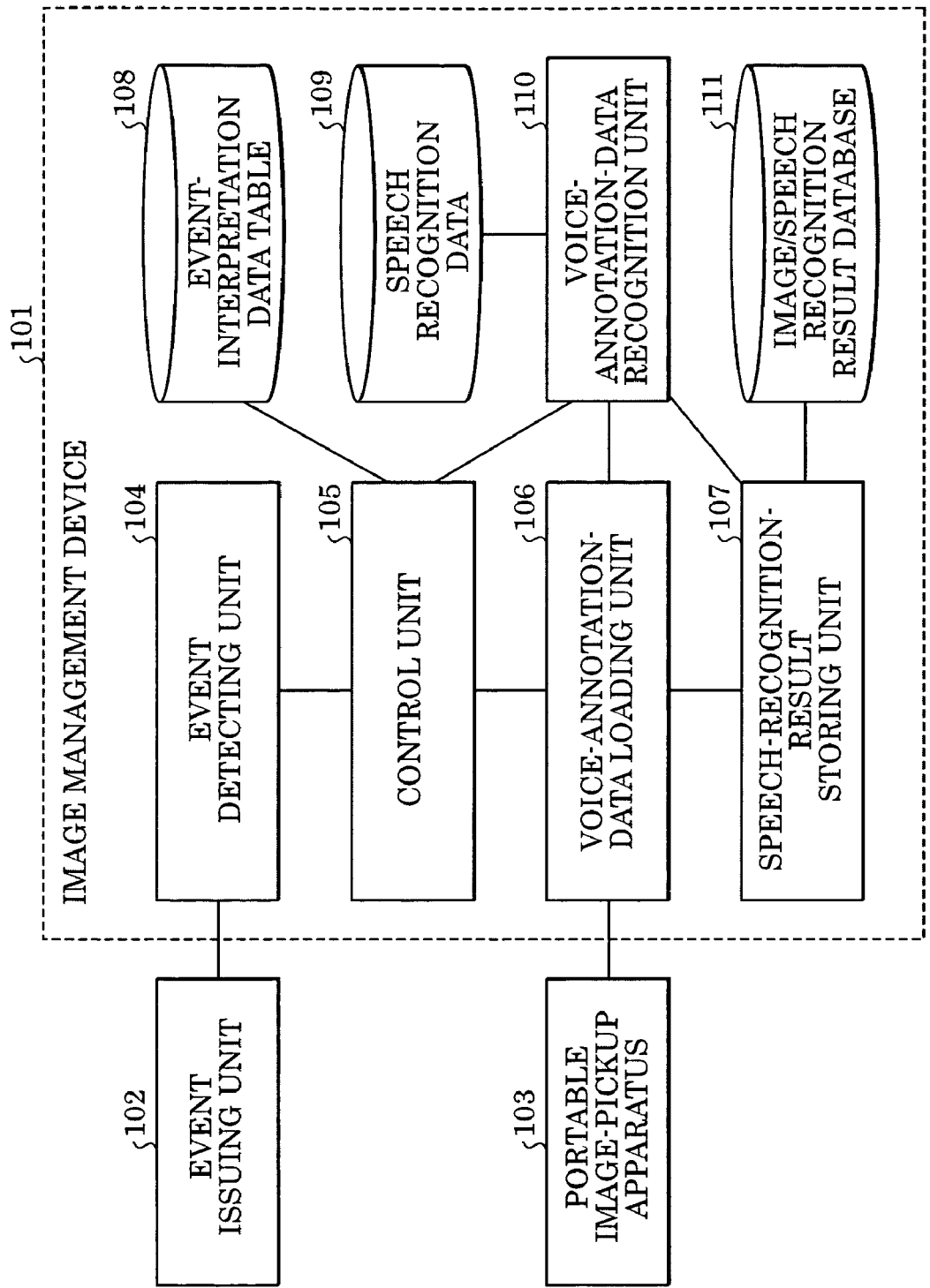
FIG. 1 shows the functional structure of an image management device according to an embodiment of the present invention.

FIG. 1 shows the functional structure of an image management device according to the present embodiment. An image management device 101 is connected to an event issuing unit 102 and a portable image-pickup apparatus 103. The event issuing unit 102 is included in an external apparatus or application, and issues various events. The events may be implemented by setting specific values in a specific memory area.

In basic operation, the image management device 101 receives an event entered and starts operation if it is determined that the event received is appropriate. The operation involves the speech recognition of voice annotation data captured from the portable image-pickup apparatus 103, and the storing of the voice data with images in an image/speech recognition result database in the image management device 101.

An event detecting unit 104 in the image management device 101 receives an event from the event issuing unit 102 outside the image management device 101. Then, the event received is sent to a control unit 105, where, in response to the event, it is determined whether or not it is appropriate to proceed with the speech recognition. The determination is made based on an event-interpretation data table 108 in the image management device 101. The result of determination is held, for example, as a flag. The event issuing unit 102 may be provided inside the image management device 101.

Figures 3, 4:
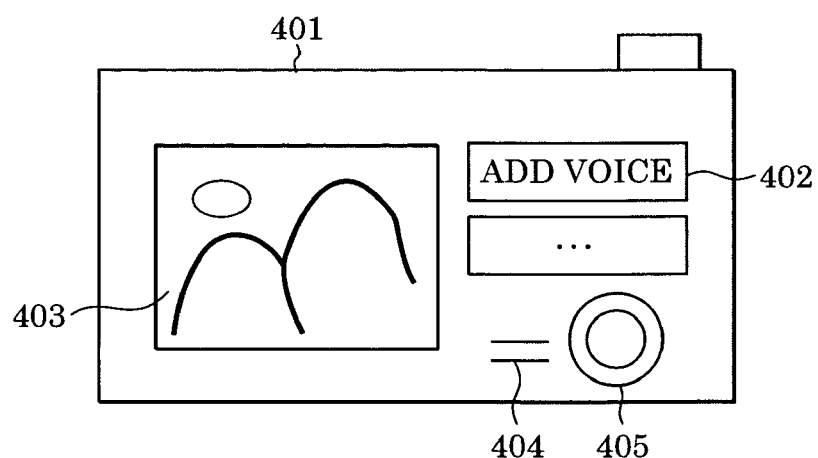
FIG. 3 shows an example of an event-interpretation data table for the image management device according to the embodiment of the present invention.
FIG. 4 shows an example of a portable image-pickup apparatus according to a first embodiment.

FIG. 3 shows an example of the event-interpretation data table. The table 301 contains event names paired with values indicating whether or not the speech recognition is to be started. The start of speech recognition is determined when an event for initiating the speech recognition (value "Yes") is detected.

When the start of speech recognition is determined, a voice-annotation-data loading unit 106 loads voice annotation data from the portable image-pickup apparatus 103 into the image management device 101.

The loaded voice annotation data is sent to a voice-annotation-data recognition unit 110, where speech recognition is performed on the loaded voice annotation data through the use of an existing speech recognition technology. The result of speech recognition is sent to a speech recognition-result storing unit 107. The voice-annotation-data recognition unit 110 uses speech recognition data 109, such as speech recognition grammar and acoustic models, for use in speech recognition.

The speech recognition-result storing unit 107 pairs text-based speech recognition results with corresponding images, and stores them in an image/speech recognition result database 111. For example, the result of speech recognition may be stored in a comment area within an image data file, or may be stored in a file with the same name but with an extension different from that of the image data file. Alternatively, the filename of image data may be changed in response to the result of speech recognition.

Figure 2:
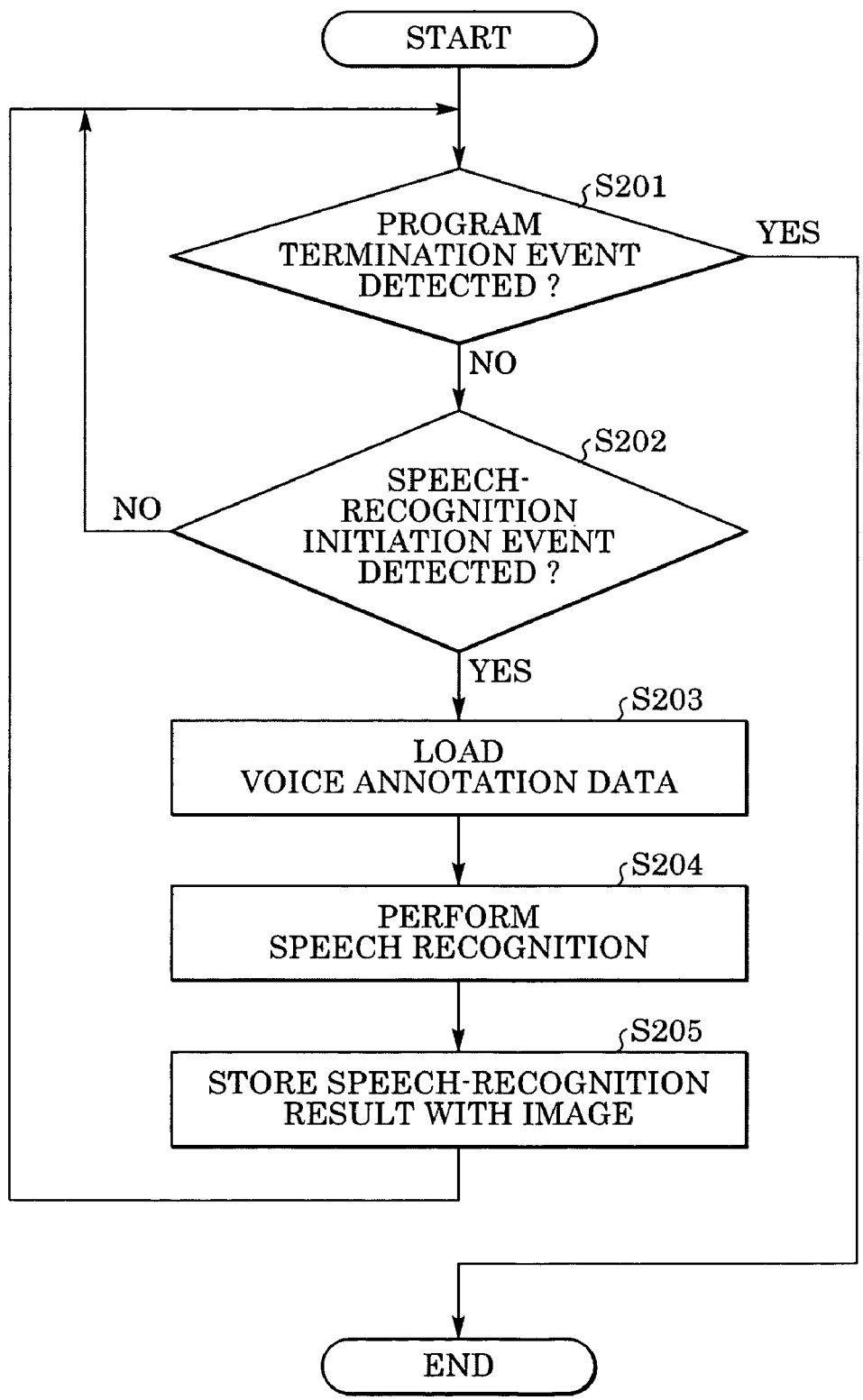
FIG. 2 is a flowchart of the image management device according to the embodiment of the present invention.

FIG. 2 is the main flow of the image management device 101. The flow is initiated when the image management device 101 starts. First, it is determined whether or not a program termination event is detected (S201). The process is terminated if the termination event is detected.

If the termination event is not detected, it is determined whether or not an event for initiating the speech recognition is detected (S202) based on the event-interpretation data table shown in FIG. 3. If an event for initiating the speech recognition is not detected, the process returns to the top of the flow without executing the subsequent process. If an event for initiating the speech recognition is detected, voice annotation data is loaded from the portable image pickup apparatus (S203).

The loaded voice annotation data is subjected to speech recognition (S204). The process of speech recognition will not be detailed here, as it is a known technology. Together with an image from the portable image-pickup apparatus, a text-based speech recognition result is stored in the database within the image management device 101 (S205).

On completion of the above-described process, the process returns to the top, and the checking of events starts again.

Thus, when the speech recognition of voice annotation data entered in a portable image-pickup apparatus is executed on a PC to which the portable image-pickup apparatus is connected, the speech recognition can be triggered by an event, such as an image upload order, that is not an explicit speech recognition order.

Second Embodiment

An example of an image retrieval system that includes an image management device will now be described. FIG. 4 shows an example of a portable image-pickup apparatus to be used in the present embodiment.

The user captures images using a portable image-pickup apparatus 401, such as a digital camera or a camera-enabled cell phone. The portable image-pickup apparatus 401 is provided with an image confirmation screen 403. An operation mode switch 405 allows for switching between an image pickup mode and an image confirmation mode in which images previously captured can be confirmed on the image confirmation screen 403.

In the image confirmation mode, the user can add voice annotations to specific images. For example, with a desired image displayed on the image confirmation screen 403, the user can add a voice annotation to the image by pressing a voice-annotation addition button 402. Specifically, pressing of the button starts the capturing of a certain period of speech through a microphone 404. Then, the voice data is associated with the image and stored in a memory within the portable image-pickup apparatus.

For example, it is presumed that a voice annotation, such as "hakone-no-yama", is added. In this case, the portable image-pickup apparatus associates and stores the voice data with the corresponding image in a memory within the portable image-pickup apparatus.

Figures 5, 6:
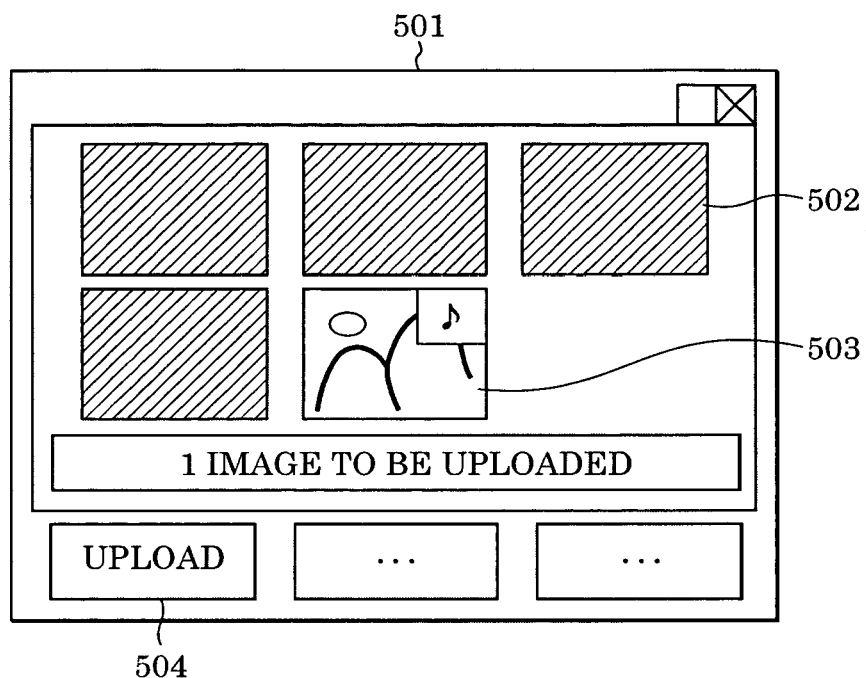
FIG. 5 shows an example of an operation user-interface (UI) screen during image upload according to the first embodiment.
FIG. 6 shows an example of a file storing the result of speech recognition according to the first embodiment.

FIG. 5 shows an example of an operation user interface (UI) screen during image upload. When the portable image-pickup apparatus is connected to the PC, an application having an image confirmation dialog 501 is started. Images within the portable image-pickup apparatus connected to the PC are displayed as thumbnails in the image confirmation dialog 501.

In the list of thumbnail images, uploaded images 502 and images to be uploaded 503 may be displayed differently. For example, in FIG. 5, thumbnails of uploaded images are shaded for the user to identify which images have already been uploaded. Moreover, a thumbnail of an image to which a voice annotation is added may be marked with a particular symbol. In FIG. 5, for example, such a thumbnail is marked with a musical note symbol.

The user selects an image to be uploaded, and selects an upload order button 504. Selecting the button allows for uploading of the selected image in the portable image-pickup apparatus 401 to an image database in the PC.

At the same time, an image-upload order event is issued to the image management device 101. Using the data table 301 in FIG. 3, the image-upload order event is interpreted as the start of speech recognition. Then, voice annotation data added to the corresponding image is loaded from the portable image-pickup apparatus 401 and subjected to speech recognition. The result of the speech recognition is placed in a file and stored in a database in the image management device 101.

FIG. 6 shows an example of such a file. A speech-recognition result file 601 stores the result of speech recognition performed on voice annotation data. One speech-recognition result file is generated from one piece of voice annotation data.

A speech recognition engine can output a plurality of candidates of the recognition result for one piece of speech (voice annotation data). In the speech-recognition result file 601, one candidate of the result is stored in each line. The example in FIG. 6 shows the output of five candidates of the recognition result.

Each candidate of the recognition result contains three fields. A field beginning with "string=" for a speech-recognition phonemic string 602 contains a phonemic string of the speech recognition result. A field beginning with "type=" for a speech-recognition grammar type 603 contains language control information (type of speech recognition grammar) used for the output of the result. In this example, two grammars, such as grammar of a phonemic typewriter (type=typewriter) and grammar for the recognition of general words (type=isolatedword) are used for recognition. The last field beginning with "score=" for a score 604 contains a score of the candidate for the recognition result. This score is calculated from acoustic likelihood and linguistic likelihood. A higher score indicates higher reliability of the recognition result.

Such a speech-recognition result file 601 is stored in an image/speech recognition result database 111 in the image management device 101. Specifically, the speech-recognition result file 601 with the same filename as the corresponding image data, but with the extension changed to "va", is stored in the same folder as the image data.

Figure 7:
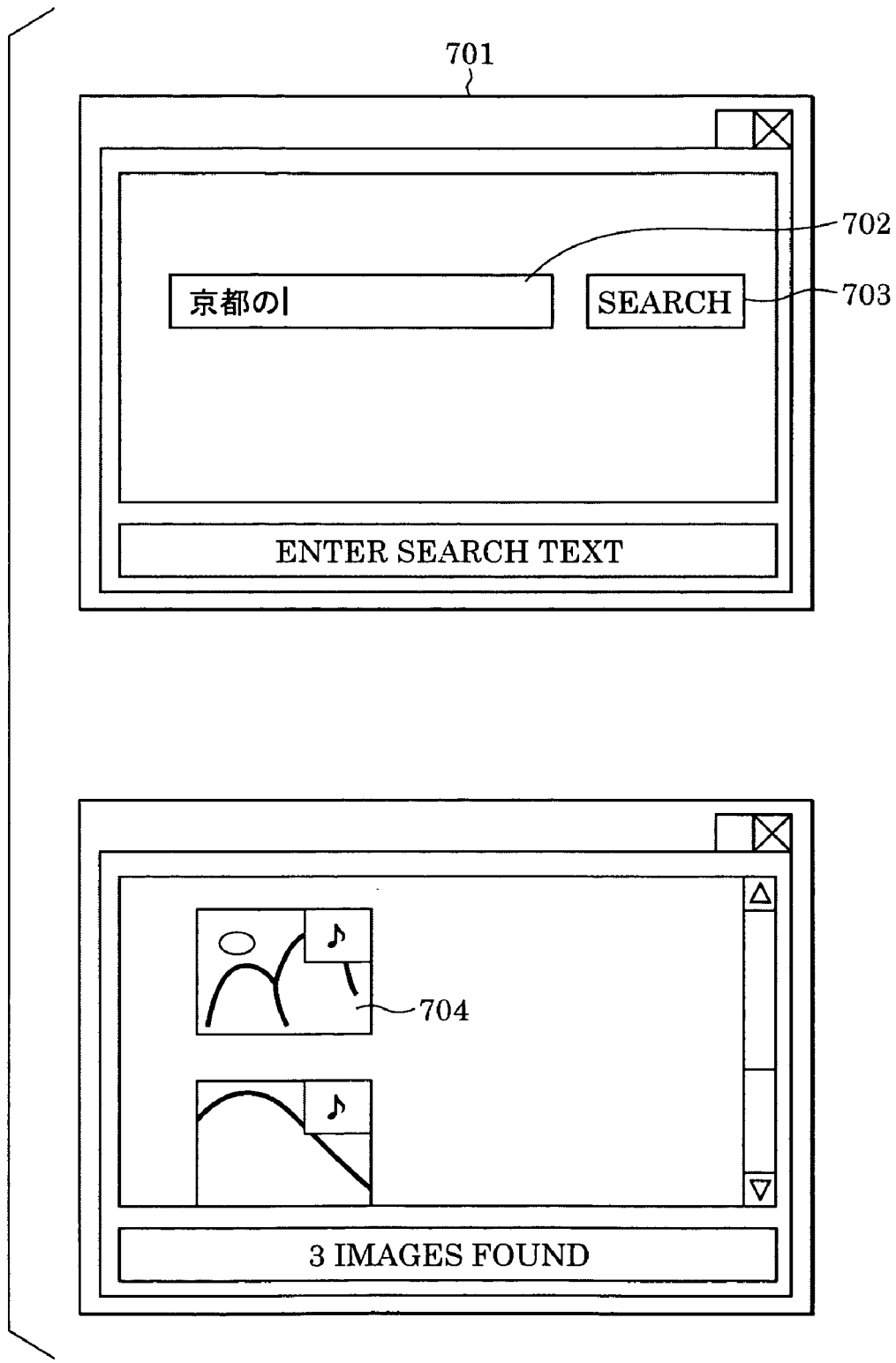
FIG. 7 shows an example of a UI screen during image retrieval using an image/speech recognition result database in an image management device according to the first embodiment.

FIG. 7 shows the process of image retrieval using the image/speech recognition result database 111 in the image management device 101.

The user enters a search string in a search-string entry field 702 in an image retrieval dialog 701 and selects a search start button 703. A search is performed to find images matching the search query. The retrieved images are displayed as a list of thumbnails 704.

Figure 8:
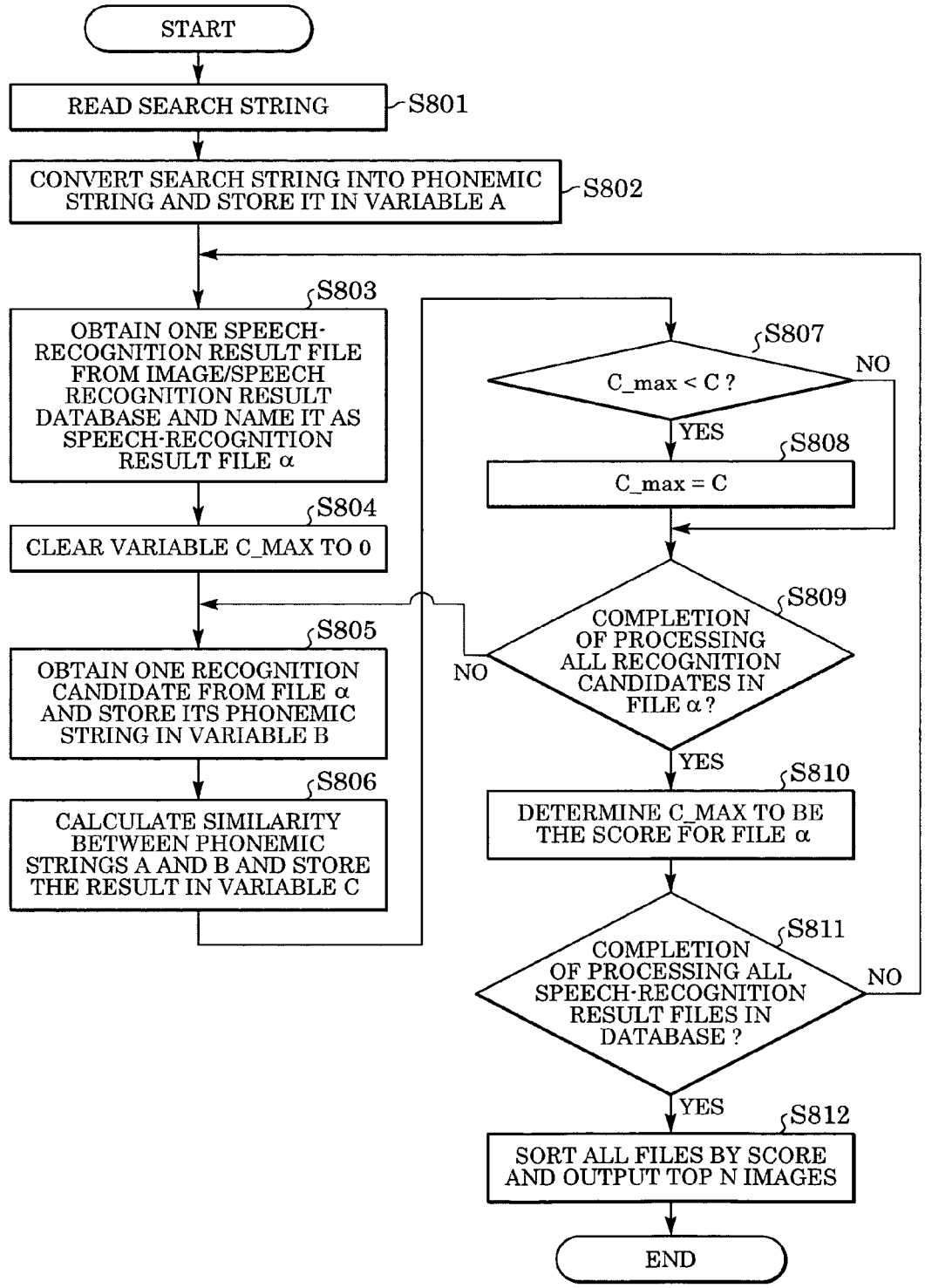
FIG. 8 is a flowchart showing the process of image retrieval using the image/speech recognition result database in the image management device according to the first embodiment.

The flow of this search process is shown in FIG. 8. Selection of the search start button 703 in FIG. 7 starts the flow.

First, the search string of a mixture of a Japanese phonetic character and Kanji (Chinese) characters is read from the search-string entry field 702 (S801). Next, using an existing language-processing method, the search string is converted into a phonemic string (S802) and stored in variable A.

Then, one speech-recognition result file 601 is obtained from the image/speech recognition result database 111 in the image management device 101. Here, the obtained file is named a speech-recognition result file α (S803).

Then variable C_max is cleared to zero (S804). Next, a speech recognition candidate is obtained from the speech-recognition result file α. As shown in FIG. 6, the candidate is information corresponding to each line in the speech-recognition result file 601. The speech-recognition phonemic string following "string=" of the obtained candidate is stored in variable B (S805).

Next, the similarity between the phonemic strings stored in variables A and B is calculated (S806). This can be implemented through the use of an existing dynamic-programming method. The calculated similarity value is stored in variable C.

The stored variable C is compared with C_max (S807). If C is larger than C_max, C_max is updated with C (S808).

The process described above is performed on all candidates of speech recognition in the speech-recognition result file α. On completion of the processes for all the recognition candidates (S809), C_max is determined to be the score for the speech-recognition result file α (S810).

The above-described process is implemented for all speech-recognition result files 601 in the image/speech recognition result database 111. On completion of the processes for all the speech-recognition result files (S811), the files are sorted by the score calculated for each file. The top N images are presented to the user (S812), and the flow ends here.

Thus, images in the image management device can be retrieved using the text data.

Third Embodiment

In the embodiments described above, the image-upload order event serves as an event for initiating the speech recognition. The speech recognition can also be initiated by other events. Examples include a "connection event" issued when a connection is established between an image management device 101 and a portable image-pickup apparatus 401. Since the speech recognition is started without issuing the image-upload order event in this case, the intended operation can be achieved with fewer processes.

Examples also include a "startup event" issued when a specific application is started, and a "search-window opening event" issued when an image search window is opened. The result of speech recognition can thus be obtained when actually needed.

Other examples include a "mouse-click event" issued when a thumbnail image, as in FIG. 5, is selected with a mouse; a "mouse-over event"; and an "image-editing event" issued after editing a specific image with an image-editing tool. These examples allow for performing the speech recognition only on voice data added to images that may have actually interested the user. The advantage here is that necessary data is reliably processed and unnecessary data can be left unprocessed.

A "timer event" issued at certain intervals may also be used. This provides the user with scheduling capability.

Fourth Embodiment

In the embodiments described above, the start of speech recognition is determined only by received specific events. However, it can also be determined based on a combination with other information in the image management device 101. For example, the determination can be made based on conditional expressions described in an event-interpretation data table 901, as shown in FIG. 9.

In the example shown in FIG. 9, information as to whether or not a speech-recognition result file 601 is stored in the image/speech recognition result database 111 is incorporated into the determination based on a timer event. In this case, when a certain timer event (for example, every ten minutes) is issued, the image/speech recognition result database 111 is searched to perform speech recognition only on voice data from which a speech-recognition result file 601 has not yet been generated.

Furthermore, various types of speech recognition data may be stored such that the type of such data to be used in speech recognition can be changed depending on the type of event. For example, in the cases of a "mouse-click event" and an "image-editing event" which require relatively quick processing, speech recognition data that allows for high-speed speech recognition is used even at the expense of accuracy. On the other hand, for an image-upload order event and a timer event, speech recognition data that allows for accurate speech recognition is used even at the expense of speed.

In the present invention, a storage medium on which a software program code for performing the functions of the above-described embodiments is recorded may be supplied to a system or apparatus such that a computer (or central processing unit (CPU) or micro-processing unit (MPU)), that is, the system or apparatus reads out and executes the program code stored in the storage medium.

In this case, the program code read out from the storage medium performs the functions of the above-described embodiments, so that the storage medium storing the program code constitutes the present invention.

The storage medium for supplying the program code may be, for example, a floppy disk, a hard disk, an optical disk, a magneto-optical (MO) disk, a CD-ROM, a CD-recordable (CD-R), a magnetic tape, a non-volatile memory card, and a ROM.

The functions of the above-described embodiments can be performed not only by a computer reading and executing the program code, but also by an operating system (OS) running on the computer and executing a whole or part of the actual processing in accordance with instructions of the program code.

The functions of the above-described embodiments can also be performed, after the program code read out from the storage medium is written in an expansion unit connected to a computer or is written in a memory of a function expansion board in a computer, by a CPU or the like, which is included in the function expansion board or expansion unit, executing a whole or part of the actual processing in accordance with instructions of the program code.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-163363 filed Jun. 1, 2004, which is hereby incorporated by reference herein.

What is claimed is:

1. An information processing device comprising:
    obtaining means for obtaining voice information related to an image;
    holding means for holding a table which stores a plurality of different events and information on whether each of the plurality of different events is subjected to speech recognition, wherein each of the plurality of different events is an event issued when an image is uploaded, an event issued when a connection is established between the information processing device and an image-pickup apparatus, an event issued at certain intervals, an event is sued when a pro gram is started, an event is sued when a specific dialog is launched, an event issued when a specific thumbnail image is selected, or an event issued after editing an image;
    detecting means for detecting an event by comparing with the plurality of different events stored in the table;
    determining means for determining whether the detected event is subjected to the speech-recognition, based on the information stored in the table;
    speech recognition means for performing speech recognition on voice information obtained by the obtaining means when the determining means determines that detected event is subjected to the speech recognition; and
    storing means for associating and storing a speech recognition result obtained by the speech recognition means with the image.

2. An information processing method implemented in an information processing device, the method comprising:
    obtaining voice information related to an image;
    holding a table which stores a plurality of different events and information on whether each of the plurality of different events is subjected to speech recognition, wherein each of the plurality of different events is an event issued when an image is uploaded, an event issued when a connection is established between the information processing device and an image-pickup apparatus, an event issued at certain intervals, an event issued when a program is started, an event issued when a specific dialog is launched, an event issued when a specific thumbnail image is selected, or an event issued after editing an image;
    detecting an event by comparing with the plurality of different events stored in the table;
    determining whether the detected event is subjected to the speech-recognition, based on the information stored in the table;
    performing speech recognition on voice information obtained by the obtaining means when the determining means determines that the detected event is subjected to the speech recognition; and
    associating and storing a speech recognition result with the image.

3. A storage medium which stores computer-executable process steps for causing a computer to execute the information processing method of claim 2.

* * * * *